United States Patent
Taylor

[15] 3,648,980
[45] Mar. 14, 1972

[54] PORTABLE WINDBREAK

[72] Inventor: John D. Taylor, Route 3, P.O. Box 5, Perryton, Tex. 79070

[22] Filed: Aug. 10, 1970

[21] Appl. No.: 62,465

[52] U.S. Cl. .......................... 256/12.5, 256/24, 119/20, 296/1, 296/26
[51] Int. Cl. .......................... E01f 7/02
[58] Field of Search .......... 256/24, 25, 26, 12.5, 32, 33, 256/34; 160/135, 351; 119/20, 82; 296/1, 26

[56] References Cited

UNITED STATES PATENTS

| | | | |
|---|---|---|---|
| 1,213,074 | 1/1917 | Clark | 160/351 X |
| 753,833 | 3/1904 | Copley | 119/82 |
| 482,844 | 9/1892 | Herrington | 160/135 |
| 1,591,753 | 7/1926 | Flaugh | 256/26 X |
| 2,810,554 | 10/1957 | Blazey | 256/25 |
| 3,471,129 | 10/1969 | Mpakarakes | 256/24 |

*Primary Examiner*—Dennis L. Taylor
*Attorney*—Robert K. Rhea

[57] ABSTRACT

A portable windbreak for animals comprising a plurality of panels hingedly joined together for movement between an extended barrier forming position and a retracted folded position. Wheels, laterally connected with the center panel, render the retracted windbreak portable in trailerlike fashion by a tongue connected with one end of the center panel. Erection struts, removably connected with the center panel and a prime mover, raise the retracted windbreak from a horizontal position to a vertical edgewise wind shelter position and vice versa. Ground anchor means, connected with the windbreak, maintain it in an erected position.

4 Claims, 7 Drawing Figures

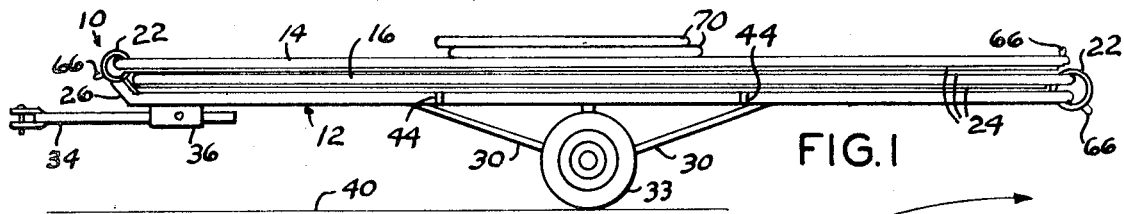
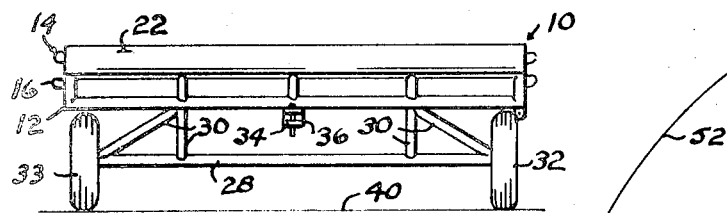
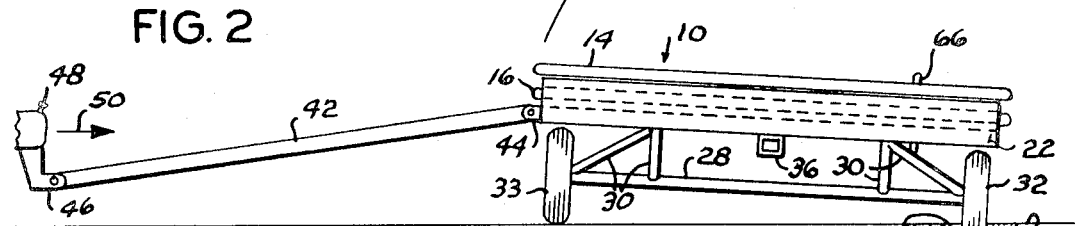
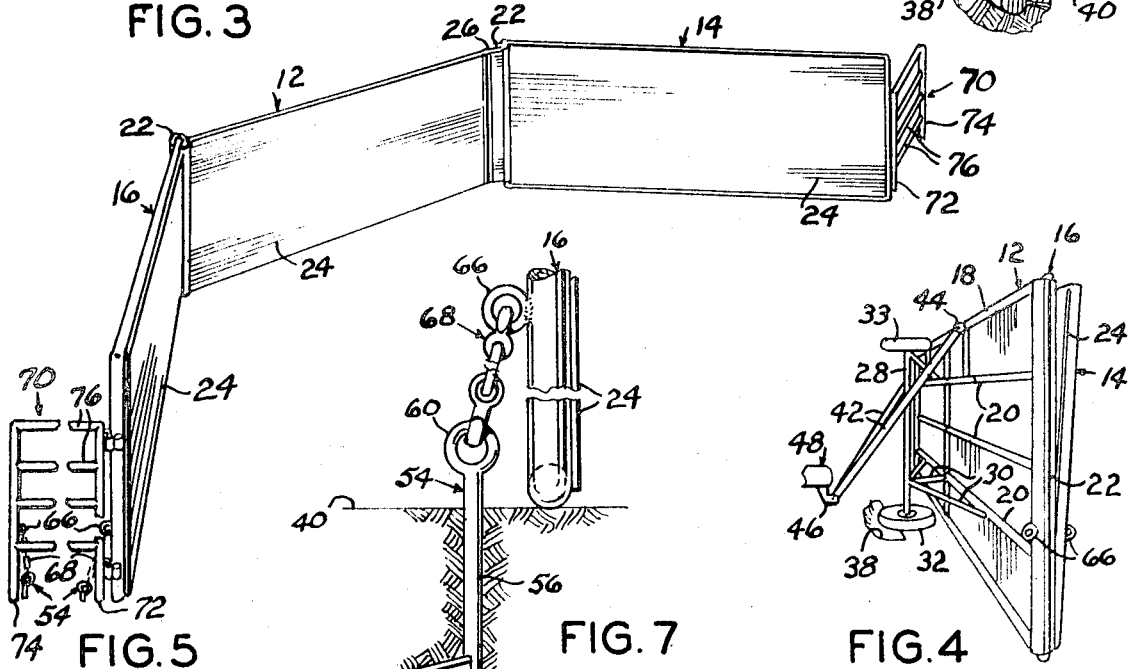
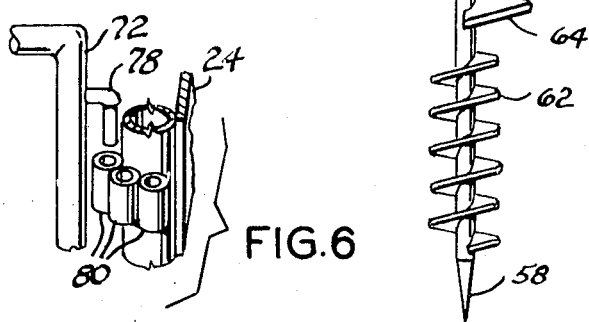
JOHN D. TAYLOR
INVENTOR.
BY
Robert K. Rhea
AGENT

3,648,980

PORTABLE WINDBREAK

BACKGROUND OF THE INVENTION

1. Field of the Invention

The present invention relates to fence-like barriers and more particularly to a portable folding panel construction which may be longitudinally collapsed and expanded by a folding of the sections thereof on each other and about hinged connections.

On some ranches and farms in the plains area there are no natural windbreaks, such as trees, hills or ravines affording protection for domestic animals during storms. As is well known, some animals drift downwind, as a herd, during a storm, such as a blizzard, until they encounter a boundry wire fence wherein the animals at the rear of the herd crowd the animals adjacent the fence until the fence is broken down and the herd continues its movement thus necessitating a hunt for the animals, after the storm has passed, and repairing the fences. I have found that this problem may be overcome to some extent by providing a windbreak for the animals wherein they quickly learn to seek shelter on the downwind side of the windbreak.

2. Description of the Prior Art

The prior art discloses a plurality of portable fence-like devices forming stalls or feeders for livestock. The most pertinent patent of the prior art is U.S. Pat. No. 3,471,129, which discloses a hingedly joined sectional fence-like device for temporary erection as a barrier at selected locations, such as an airport, for admitting access to the grounds or directing movement of pedestrians along a predetermined course. The fence of this patent is anchored by means permanently located rather than being movable to any position on a ranch, or the like, for erection.

This invention is distinctive over this patent by the manner in which the panels are interconnected and its portable trailer-like configuration when collapsed. Furthermore, the windbreak of this invention does not require a fixed position anchoring means for maintaining it erected.

SUMMARY OF THE INVENTION

A pair of elongated rectangular panels are hingedly connected for longitudinal overlapping movement to the respective ends of a center panel. Wheel and axle means, connected with one side surface of the center panel, permits mobile movement of all the panels, when their planes are horizontally disposed, by a tongue removably connected to one end of the center panel. Means is provided for tilting the overlapped panels to a vertical edgewise position wherein the pair of panels are then positioned in outwardly directed obtuse angular relation with respect to the vertical plane of the center panel. A brace frame is connected with the free end of each one of the pair of panels. Ground engaging anchor means is connected with each brace frame, pair of panels and intermediate portions of the center panel to maintain the windbreak in erected position.

The principal object of this invention is to provide a windbreak for livestock, or the like, which may be easily collapsed and positioned for mobile movement and subsequently erected at another location.

BRIEF DESCRIPTION OF THE DRAWINGS

FIG. 1 is a side elevational view of the windbreak in collapsed mobile position;

FIG. 2 is a left end elevational view of FIG. 1;

FIG. 3 is a right end elevational view of FIG. 1 illustrating the collapsed windbreak in position to be lifted to a vertical edgewise position by lifting means connected with a prime mover;

FIG. 4 is a perspective view, to a smaller scale, illustrating the collapsed windbreak when lifted to a vertical edgewise position;

FIG. 5 is a perspective view, to another scale, of the windbreak when erected in windbreak position;

FIG. 6 is a fragmentary exploded perspective view illustrating the manner of connecting the brace frames to the free ends of the pair of panels; and FIG. 7 is a fragmentary elevational view, partially in section, illustrating anchor means connected with one end portion of the windbreak.

DESCRIPTION OF THE PREFERRED EMBODIMENT

Like characters of reference designate like parts in those figures of the drawings in which they occur.

In the drawings:

Referring more particularly to FIGS. 1, 2, 3 and 4, the reference numeral 10 indicates the windbreak, as a whole, shown in collapsed position. In its preferred form the windbreak comprises a center panel 12 and a pair of end panels 14 and 16 which are hingedly connected to respective ends of the center panel 12 so that the pair of panels 14 and 16 may be positioned in a collapsed overlapping relation on one side of the center panel for mobile movement of the windbreak as hereinafter described.

Each of the panels are elongated rectangular in general configuration and comprise a rectangular panel frame 18 (FIG. 4) formed of angle iron or pipe, as shown, including a plurality of braces 20 extending longitudinally between the ends of the respective panel frame in spaced-apart relation. The hinge connecting the pair of panels 14 and 16 to the center panel 12, is formed by a section of pipe 22 of larger diameter than the panel frame pipes extending transversely of the center panel and connected thereto forming the end members of the center panel frame 18. One end member of the frames of the pair of panels 14 and 16 extends loosely through the respective hinge pipe 22 permitting movement of the free end portion of the pair of panels 14 and 16 toward and away from one side of the center panel. Obviously, other type of hinge means may be employed, if desired. Each of the panel frames have sheet material 24 secured preferably to the downwind side thereof for interrupting wind currents when the windbreak is erected, as shown in FIG. 5. The sheet material is substantially coextensive with the respective panel frame and may be of one piece material or in sections, such as corrugated iron, not shown, placed on the panel frames in overlapping relation. One end portion of the center panel frame 18 is turned laterally, as at 26, to compensate for the thickness of material of the pair of panels 14 and 16 when these panels are overlapped on the center panel 12.

The center frame 18 is provided with an axle 28 transversely connected to the center panel frame by braces or struts 30 and supports at its respective ends a pair of wheels 32 and 33. A tongue 34 is removably connected to one end portion of the center panel 12 by a socket 36 so that it may be removed when the windbreak is erected to the position shown by FIG. 5 to eliminate livestock doing damage to the windbreak or loosening its anchored position by rubbing against the tongue 34.

The windbreak is erected from its horizontal collapsed position of FIGS. 1, 2 and 3, by forming a depression or recess 38 in the surface of the earth 40, as by digging, so that the wheel 32 may have a portion of its periphery positioned within the recess 38. A pair of struts 42 are then connected by one end portion to a pair of spaced-apart lugs 44 secured to the center panel 12 at its marginal edge adjacent the wheel 33. The other end of the struts 42 are pivotally connected in A-frame fashion to a trailer-like hitch 46 connected with a prime mover, such as a pickup truck, or the like, fragmentarily illustrated at 48. Movement of the prime mover, downwind and toward the windbreak 10, in the direction of the arrow 50, then pivots the collapsed windbreak upwardly, in the direction of the curved arrow 52, by fulcruming the wheel 32 against one side of the recess 38 until the windbreak is disposed, as shown by FIG. 4, wherein the panels are positioned substantially vertical edgewise. The end panels 14 and 16 are then manually pivoted outwardly about their vertical hinged connection with the center panel 12 to the approximate position illustrated in FIG.

5 wherein the planes of the end panels 14 and 16 are disposed in a downwind direction at an obtuse angle with respect to the plane of the center panel.

The windbreak is then anchored in this position by a plurality of auger-like anchors 54 which are manually inserted into the earth in a screwing action. The anchor comprises an elongated rod 56 having a sharpened bottom end 58 and a loop or eye 60 in its top end. An outstanding flange 62 is connected to the depending end portion of the rod 56 in helical fashion and a second flange 64, diametrically greater than the flange 62, is connected in similar fashion and pitch to the rod between the flange 62 and eye 60 so that the uppermost flange 64 follows and enlarges the path formed in the soil by the flange 62. One of the anchor means 54 is inserted into the earth, on the upwind side of the expanded windbreak adjacent the respective free end of the end panels 14 and 16 and the respective hinge member 22. The eye 60 of each anchor means 54 is preferably connected to a loop 66 secured to the free end member of each panel 14 and 16 and the hinge members 22 by a flexible element, such as a chain 68, or the like. When using the chain 68 a load binder, not shown, may be used for tightening the chain 68 in a conventional manner. The mass of the panels and wind force against the upwind side, when positioned as shown in FIG. 5, prevents livestock tipping over the windbreak in an upwind direction. The anchor means 54 prevents any movement of the expanded panels in a downwind direction by wind force or contact therewith by animals.

Since the windbreak, when erected, is anchored, only at its depending edge portions against wind action strong winds tend to generate vibrations, particularly in the end panels of the windbreak. The frequency of these vibrations vary in direct relation to the force of the wind and will result, in time, in structural failure of the panel frames. The wind induced vibrations may be substantially eliminated by connecting a brace frame 70 to the free end of each of the panels 14 and 16.

The brace frames 70 each comprise a pair of vertical posts 72 and 74, each having a length at least as great as one-half the vertical height of the respective panel 14 and 16, which are rigidly joined together in parallel spaced-apart relation by a plurality of horizontally disposed rails 76. The post 72 is provided with a pair of downwardly directed hinge hook members 78, only one being shown in detail, (FIG. 6) which are removably received by a selected one of a plurality of tubular sockets 80 cooperatively secured to the respective vertical panel frame end member. Each of the posts 74 are similarly provided with loops 66 for connection with a chain 68 and anchor means 54 in the manner described hereinabove for the panels 14 and 16. The brace frames 70 are preferably disposed at right angle with respect to the plane of the respective panel 14 and 16.

After the device is erected or expanded, as shown in FIG. 5, and anchored, the struts 42 and tongue 34 are removed from the center panel until such time as it is desired to relocate the windbreak in a different area.

Obviously the invention is susceptible to changes or alterations without defeating its practicability, therefore, I do not wish to be confined to the preferred embodiment shown in the drawings and described herein.

I claim:

1. A portable windbreak, comprising:
   a central panel;
   wheel and axle means supporting said central panel in a mobile fashion;
   wing panels hingedly connected to respective opposing ends of said central panel for movement from an overlapping position on one side of said central panel to an extended angular position from said one side of said central panel;
   means for tilting said panels from a horizontal overlapped position to an upright edgewise position; and,
   anchor means maintaining said panels in an upright edgewise extended position,
   said anchor means including a shaft having a pointed end and having an eye formed in its other end,
   a flange helically connected with said shaft intermediate its ends for progressively entering the earth when said shaft is rotated in one direction, and,
   a flexible member extending between and connected with the eye of said shaft and an end portion of the respective said panel.

2. The windbreak of claim 1 wherein each said panel includes:
   a rectangular frame; and,
   sheet members overlying and secured to one surface of said frame.

3. The windbreak of claim 2 in which said anchor means further includes:
   a brace frame connected with and extending laterally of the end portion of each said wing panel opposite its connection with said central panel.

4. The windbreak of claim 3 in which the tilting means includes:
   at least one elongated strut removably connected at one end with an intermediate portion of one side edge of said central panel, the other end of said strut being adapted for connection with a prime mover.

* * * * *